US00RE40950E

(19) United States
(12) Reissued Patent
Ota et al.

(10) Patent Number: US RE40,950 E
(45) Date of Reissued Patent: Nov. 10, 2009

(54) FERRITIC STAINLESS STEEL PLATE

(75) Inventors: Hiroki Ota, Chiba (JP); Yasushi Kato, Chiba (JP); Takumi Ujiro, Chiba (JP); Susumu Satoh, Chiba (JP)

(73) Assignee: JFE Steel Corporation (JP)

(21) Appl. No.: 10/678,057

(22) PCT Filed: Mar. 14, 2000

(86) PCT No.: PCT/JP00/01536

§ 371 (c)(1),
(2), (4) Date: Nov. 20, 2000

(87) PCT Pub. No.: WO00/60134

PCT Pub. Date: Oct. 12, 2000

Related U.S. Patent Documents

Reissue of:
(64) Patent No.: 6,458,221
Issued: Oct. 1, 2002
Appl. No.: 09/700,779
Filed: Mar. 14, 2000

(30) Foreign Application Priority Data

Mar. 30, 1999 (JP) ..... 11-088650

(51) Int. Cl.
*C22C 38/18* (2006.01)

(52) U.S. Cl. ..... 148/325; 420/66; 420/70

(58) Field of Classification Search ..... 148/546, 148/542, 650, 603, 599, 610, 325; 420/70, 420/64, 34, 66

See application file for complete search history.

(56) References Cited

U.S. PATENT DOCUMENTS

| | | | | |
|---|---|---|---|---|
| 4,465,525 A | | 8/1984 | Yoshimura et al. | |
| 4,690,798 A | | 9/1987 | Narutani et al. | |
| 6,106,638 A | * | 8/2000 | Paradis et al. | 148/325 |

FOREIGN PATENT DOCUMENTS

| | | |
|---|---|---|
| CH | 537 459 | 5/1973 |
| EP | 0 881 305 A1 | 12/1998 |
| JP | 08-041546 | 2/1996 |
| JP | 08-092652 | 4/1996 |
| JP | 10-176223 | 6/1998 |

OTHER PUBLICATIONS

Peckner, D. et al., *Handbook of Stainless Steels*, McGraw–Hill, 1977 (XP–002053955), p. 14.2.

* cited by examiner

*Primary Examiner*—Deborah Yee
(74) *Attorney, Agent, or Firm*—DLA Piper LLP (US)

(57) ABSTRACT

The present invention provides a ferritic stainless steel sheet having excellent formability and excellent surface quality after forming. In specific means, the steel sheet contains, by mass %, 0.02 to 0.06% of C, 1.0% or less of Si, 1.0% or less of Mn, 0.05% or less of P, 0.01% or less of S, 0.005% or less of Al, 0.005% or less of Ti, 11 to 30% of Cr, 0.7% or less of Ni, the balance composed of Fe, and inevitable impurities, wherein N is contained to satisfy the relation to the C content represented by $0.06 \leqq (C+N) \leqq 0.12$, and $1 \leqq N/C$, and V is contained to satisfy the relation to the N content represented by $1.5\times10^{-3} \leqq (V\times N) \leqq 1.5\times10^{-2}$ (wherein C, N and V: the contents (mass %) of the elements).

4 Claims, 5 Drawing Sheets

FERRITIC STAINLESS STEEL PLATE

Matter enclosed in heavy brackets [ ] appears in the original patent but forms no part of this reissue specification; matter printed in italics indicates the additions made by reissue.

TECHNICAL FIELD

The present invention relates to a ferritic stainless steel sheet suitable for use for building facing materials, kitchen utensils, chemical plants, water tanks, etc. Particularly, the present invention relates to a ferritic steel sheet having excellent formability for press, and good surface properties after forming. In the present invention, the steel sheet includes a steel plate, and a steel strip.

BACKGROUND ART

Stainless steel sheets have beautiful surfaces and excellent corrosion resistance, and are thus widely used for building facing materials, etc. Particularly, austenitic stainless steel sheets have excellent ductility and excellent formability for press, and cause no ridging, and are thus widely used for the above applications.

On the other hand, ferritic stainless steel sheets are improved in formability by the progress of the technique of purifying steel, and the use for above applications instead of austenitic stainless steel sheets of SUS 304, SUS 316, etc. have recently been studied. This is because the properties of the ferritic stainless steel, for example, the advantages of a low thermal expansion coefficient, low sensitivity to stress corrosion cracking, and low cost due to the absence of expensive Ni, have been widely known.

However, in consideration of application to formed products, the ferritic stainless steel sheets have lower ductility than the austenitic stainless steel sheets, and thus cause problems in that unevenness referred to as "ridging" occurs in the surfaces of the formed products to deteriorate the beauty of the formed products, increasing a load of surface polishing. Therefore, in order to further extend the application of the ferritic stainless steel sheets, improvements in ductility and anti-ridging property are required.

For these requirements, ferritic stainless steel having excellent formability and comprising, by weight %, 0.03 to 0.08% of C, 0.01% or less of Ni, and 2×N % to 0.2% of Al is proposed in, for example, Japanese Unexamined Patent Publication No. 52-24913. In the technique disclosed in Japanese Unexamined Patent Publication No. 52-24913, the C and N contents are decreased, and the Al content is twice or more as much as the N content to make crystal grains fine, thereby improving the ductility, r value (Lankford value), and anti-ridging property.

Heat-resistant ferritic stainless steel having excellent formability for press is proposed in Japanese Unexamined Patent Publication No. 54-112319, in which the (C+N) content is 0.02 to 0.06%, and the Zr content is 0.2 to 0.6% and 10(C+N)±0.15% to improve the ductility and the r value.

A method of producing a ferritic stainless steel sheet having excellent formability is proposed in Japanese Unexamined Patent Publication No. 57-70223, in which a ferritic stainless steel slab containing 0.08 to 0.5% of sol. Al, and at least one of B, Ti, Nb, V, and Zr is hot-rolled, cold-rolled, and then finally annealed.

However, the techniques disclosed in Japanese Unexamined Patent Publication Nos. 52-24913, 54-112319, and 57-70223 are mainly aimed at improving the ductility and r value, and remain the following problems:

(1) The techniques are premised on low C and N contents, and thus inevitably increase the cost of steel making process.

(2) Since elements such as Al and Ti are added, the amounts of inclusions of steel are increased, thereby inevitably causing surface defects due to the inclusions.

(3) The formability is greatly improved, while the anti-ridging property is not sufficiently improved. Therefore, in a case in which working such as press forming or the like is performed, the surface beauty of a formed product deteriorates, and polishing is thus required for improving the beauty to increase a polishing load, thereby increasing the cost.

Also, ferritic stainless steel having excellent corrosion resistance is proposed in Japanese Unexamined Patent Publication No. 59-193250, which contains 0.02% or less of C, 0.03% or less of N, and 0.5 to 5.0% of V. In the ferritic stainless steel disclosed in Japanese Unexamined Patent Publication No. 59-193250, corrosion resistance, particularly resistance to stress corrosion cracking, is significantly improved by adding V. However, the ferritic stainless steel disclosed in Japanese Unexamined Patent Publication No. 59-193250 has a problem of formability for press because no consideration is given to the formability for press.

Furthermore, ferritic stainless steel is proposed in Japanese Unexamined Patent Publication No. 1-201445, in which the P, S and O contents are decreased, 0.07% or less of C, 0.2% or less of Al and 0.15% or less of N and contained, and the relation between the (C+N) amount and the CR amount is optimized to improve formability and corrosion resistance. In the technique disclosed in Japanese Unexamined Patent Publication No. 1-201445, at least one of 40 S % to 2.0% of Mo, 20 S % to 0.5% of Ti, 20 S % to 0.5% of Nb, 20 S % to 0.5% of V, 20 S % to 0.5% of Zr, and 0.010% or less of B is contained to decrease both the amounts of solute nitrogen and carbon without limiting the relation between the (C+N) amount and the Cr amount, improving formability and corrosion resistance. In the technique disclosed in Japanese Unexamined Patent Publication No. 1-201445, Al, or further Ti, Zr, or the like is added, causing to increase the amounts of inclusions in steel, thereby causing the problems of inevitably producing surface defects due to the inclusions. It also remained the problem not to sufficiently improve the anti-ridging property.

Also, ferritic stainless steel having excellent weather resistance and crevice corrosion resistance is proposed in Japanese Unexamined Patent Publication No. 7-34205, which contains 0.05% or less of C, 0.10% or less of N, 0.03% or less of S, 5 to 50 ppm of Ca, 0.5% or less of Al, and 0.04% to 0.20% of P. However, the ferritic stainless steel disclosed in Japanese Unexamined Patent Publication No. 7-34205 has a high P content, and contains large amounts of Ca and Al. Therefore, the corrosion resistance is improved, while the formability is not sufficiently improved, thereby causing the problem of inevitably producing surface defects due to an increase in the amounts of inclusions.

Furthermore, a method of producing a ferritic stainless steel sheet for a floppy disk center core is proposed in Japanese Unexamined Patent Publication No. 8-92652, which has excellent formability for press and high surface hardness. The ferritic stainless steel sheet disclosed in Japanese Unexamined Patent Publication No. 8-92652 is a ferritic stainless steel containing 0.01 to 0.10% of C, 0.01 to 0.10% of N, and 0.1 to 2.0% of Mn, and impurities P, S, Si, Al and Ni at controlled contents. However, the ferritic stainless steel sheet disclosed in Japanese Unexamined Patent Publication No. 8-92652 requires control of surface roughness by final cold rolling to complicate the process, and is demanded to be further improved because of the insufficient formability.

In order to improve the anti-ridging property, strong draft in hot rolling is effective, as disclosed in, for example, Japanese Unexamined Patent Publication No. 10-53817.

In this way, the above-described conventional techniques are impossible to produce a ferritic stainless steel sheet which satisfies both surface quality and formability at low cost.

The present invention has been achieved for solving the above problems, and an object of the present invention is to provide a ferritic stainless steel sheet having good formability, and excellent anti-ridging property and surface quality after forming.

DISCLOSURE OF INVENTION

As a result of various studies for achieving the above object, the inventors found that the Ti and Al contents are decreased, N/C is 1 or more, the (C+N) amount is controlled in an appropriate range, and an appropriate amount of V is added to control precipitates such as carbides and nitrides in steel, thereby realizing excellent formability, suppressing ridging and obtaining excellent surface quality after forming. This led to the achievement of the prevent invention.

Namely, the present invention provides a ferritic stainless steel sheet having excellent formability and comprising, by mass %, 0.02 to 0.06% of C, 1.0% or less of Si, 1.0% or less of Mn, 0.05% or less of P, 0.01% or less of S, 0.005% or less of Al, 0.005% or less of Ti, 11 to 30% of Cr, 0.7% or less of Ni, the balance composed of Fe, and inevitable impurities, wherein N is contained to satisfy the relation to the C content represented by the following equations (1) and (2):

$$0.06 \leqq (C+N) \leqq 0.12 \quad (1)$$

$$1 \leqq N/C \quad (2)$$

(wherein C and N: the contents (mass %) of the elements); and

V is contained to satisfy the relation to the N content represented by the following equation (3):

$$1.5\times10^{-3} \leqq (V\times N) \leqq 1.5\times10^{-2} \quad (3)$$

(wherein N and V: the contents (mass %) of the elements).

BEST MODE FOR CARRYING OUT THE INVENTION

First, the reasons for limiting the composition of a steel sheet of the present invention are described.

C: 0.02 to 0.06 mass %

C is an element that increases strength and decreases ductility, and preferably contained in as small an amount as possible in order to improve formability. However, with a low C content of less than 0.02 mass %, the effect of making fine crystal grains due to the precipitation of fine carbonitrides and carbides such as V(C, N), VC, and $V_4C_3$ cannot be obtained. Therefore, the anti-ridging property deteriorates to produce unevenness in a processed portion during pressing, thereby deteriorating the surface quality after forming and spoiling the beauty. On the other hand, with an excessive C content of over 0.06 mass %, the formability deteriorates, and a Cr depleted zone, coarse precipitates and inclusions-which serves as the starting point of rusting, are increased. Therefore, the C content is limited to the range of 0.02 to 0.06 mass %.

Si: 1.0 mass % or less

Si is an element important for deoxidation, but an excessive Si content causes deterioration in cold formability and ductility. Therefore, the Si content is limited to 1.0 mass % or less. The Si content is preferably 0.03 to 0.5 mass %.

Mn: 1.0 mass % or less

Mn present in steel combines with S to form MnS, and is thus a useful element for securing the hot rolling workability. However, an excessive content causes deterioration in the hot workability and corrosion resistance. Therefore, the Mn content is limited to 1.0 mass % or less. The Mn content is preferably 0.3 to 0.8 mass %.

P: 0.05 mass % or less

P is a harmful element which deteriorates hot workability, and produces pitting, but a P content of up to 0.05 mass % is allowable. However, with a P content of over 0.05 mass %, the effect is significantly exhibited. Therefore, the P content must be 0.05 mass % or less.

S: 0.01 mass % or less

S is a harmful element which combines with Mn to form MnS as the starting point of rusting, and which causes grain boundary segregation to promote grain boundary embrittlement. Although the S content is preferably as low as possible, a S content of up to 0.01 mass % is allowable. However, with a content of over 0.01 mass %, the effect is significantly exhibited. Therefore, the S content is 0.01 mass % or less.

Al: 0.005 mass % or less

Figure 4:
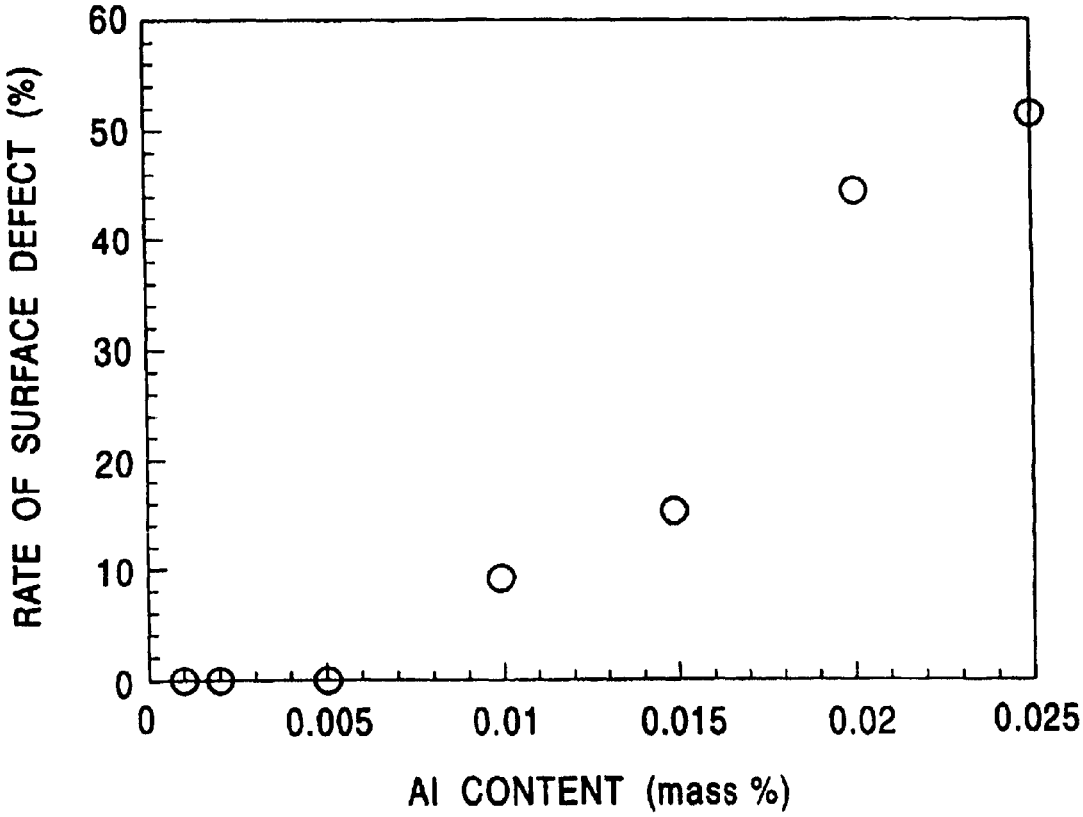
FIG. 4 is a graph showing the relation between the rate of surface defects and the Al content of a cold-rolled annealed sheet.

Al forms an oxide, and in the present invention, the Al content is thus as low as possible in order to suppress the occurrence of surface defects (scab) due to inclusions such as oxides, and the like. FIG. 4 shows the effect of the Al content on the rate of surface defects of steel comprising 0.04C-0.3Si-0.5Mn-0.04P-0.006S-0.001Ti-16.1Cr-0.3Ni-0.05N-0.06V when the Al content was changed from 0.001 to 0.025%. In this figure, the rate of surface defects represents the rate of the occurrence of defective coils assuming that a coil producing at least one scab per 10 $m^2$ of cold-rolled annealed sheet surface is considered as defective. With an Al content of 0.005% or less, the rate of surface defects can be decreased to 0%. The rate of surface defects was computed excluding a coil from which the surface layer was removed by a grinder or the like after hot rolling.

Al combines with N to form AlN suppressing the precipitation of VN, which is the main point of the present invention, and in the present invention, the Al content must be thus as low as possible. Therefore, the Al content is limited to 0.005 mass % or less.

Ti: 0.005 mass % or less

Ti combines with C and N to form TiC and TiN suppressing the precipitation of VN, VC, and $V_4C_3$, and the Ti content must be thus as low as possible. Like Al, Ti forms an oxide, and it is thus effective to decrease the Ti content as much as possible in order to suppress the occurrence of surface defects due to inclusions such as oxides, and the like. Therefore, the Ti content is limited to 0.005 mass % or less.

Cr: 11 to 30 mass %

Cr is an essential element for improving corrosion resistance. However, with a Cr content of less than 11 mass %, the sufficient corrosion resistance cannot be obtained. On the other hand, with a Cr content of over 30 mass %, an embrittled phase is easily produced after hot rolling. Therefore, the Cr content is limited to 30 mass % or less.

Ni: 0.7 mass % or less

Although Ni is an element for improving corrosion resistance, the Ni content is limited to 0.7 mass % or less because an excessive Ni content deteriorates workability and is economically disadvantageous.

N is contained to satisfy the relation to the C content represented by the following equations (1) and (2):

$$0.06 \leqq (C+N) \leqq 0.12 \quad (1)$$

$$1 \leqq N/C \quad (2)$$

wherein C and N represent the C content and the N content, respectively, by mass %.

N is conventionally thought to decrease the formability, and thus the N content must be decreased together with C in order to improve the formability. However, from the viewpoint of the anti-ridging property, it is disadvantageous to decrease the C and N contents, and thus the excellent surface quality after forming cannot be realized. In the present invention, the (C+N) amount is controlled in an appropriate range, and N/C is controlled to 1 or more.

Figure 1:
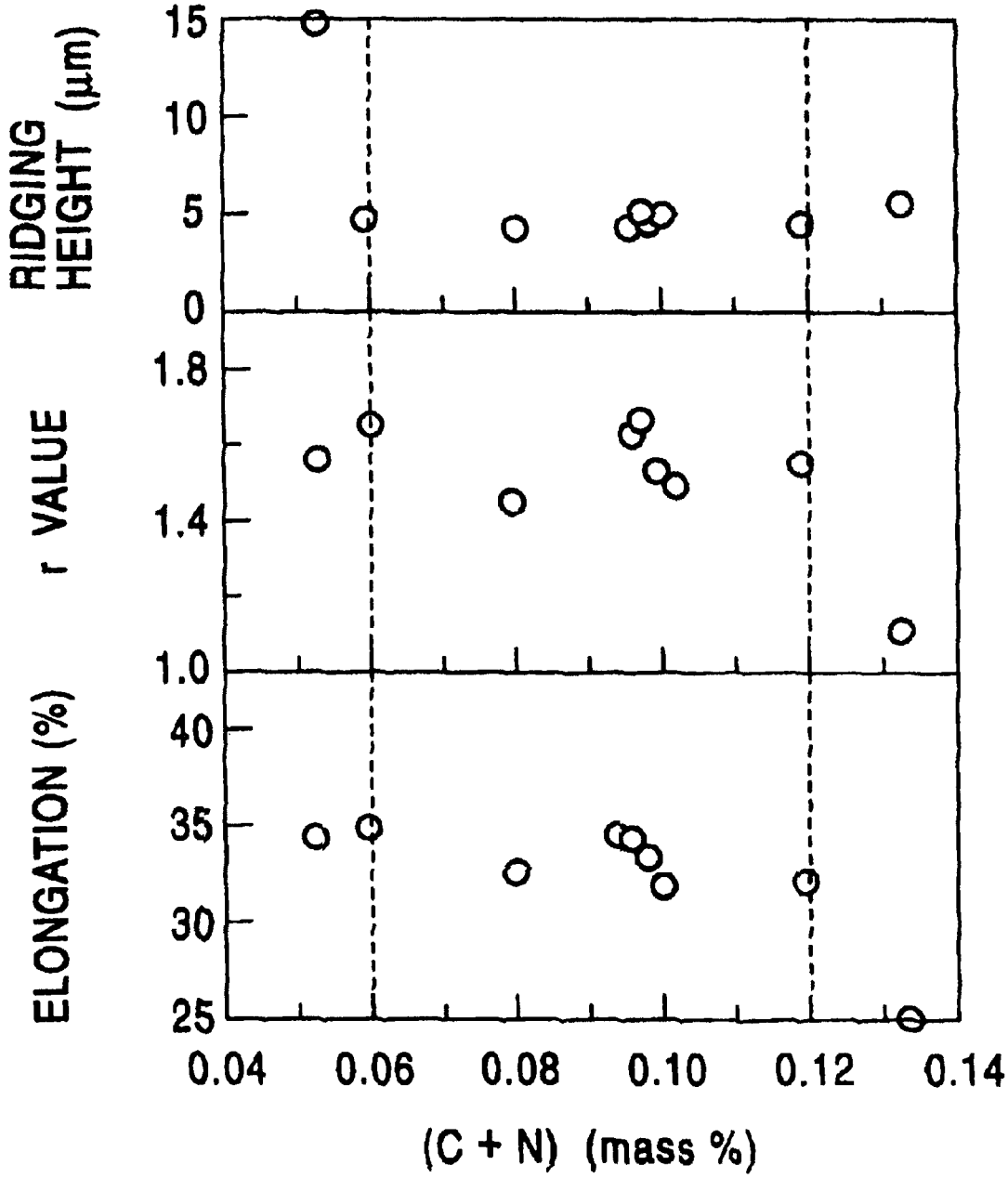
FIG. 1 is a graph showing the relation between the mechanical properties (elongation, r value, and ridging height) and (C+N) of a cold-rolled annealed sheet.

FIG. 1 shows the relation between the (C+N) amount and the mechanical properties (elongation, r value, and ridging height) of a cold-rolled annealed sheet. With a (C+N) amount of less than 0.06 mass %, the ridging height is increased to deteriorate the anti-ridging property. On the other hand, with a (C+N) amount of over 0.12 mass %, ductility and r value deteriorate. Therefore, (C+N) is limited to 0.06 to 0.12 mass %.

Figure 2:
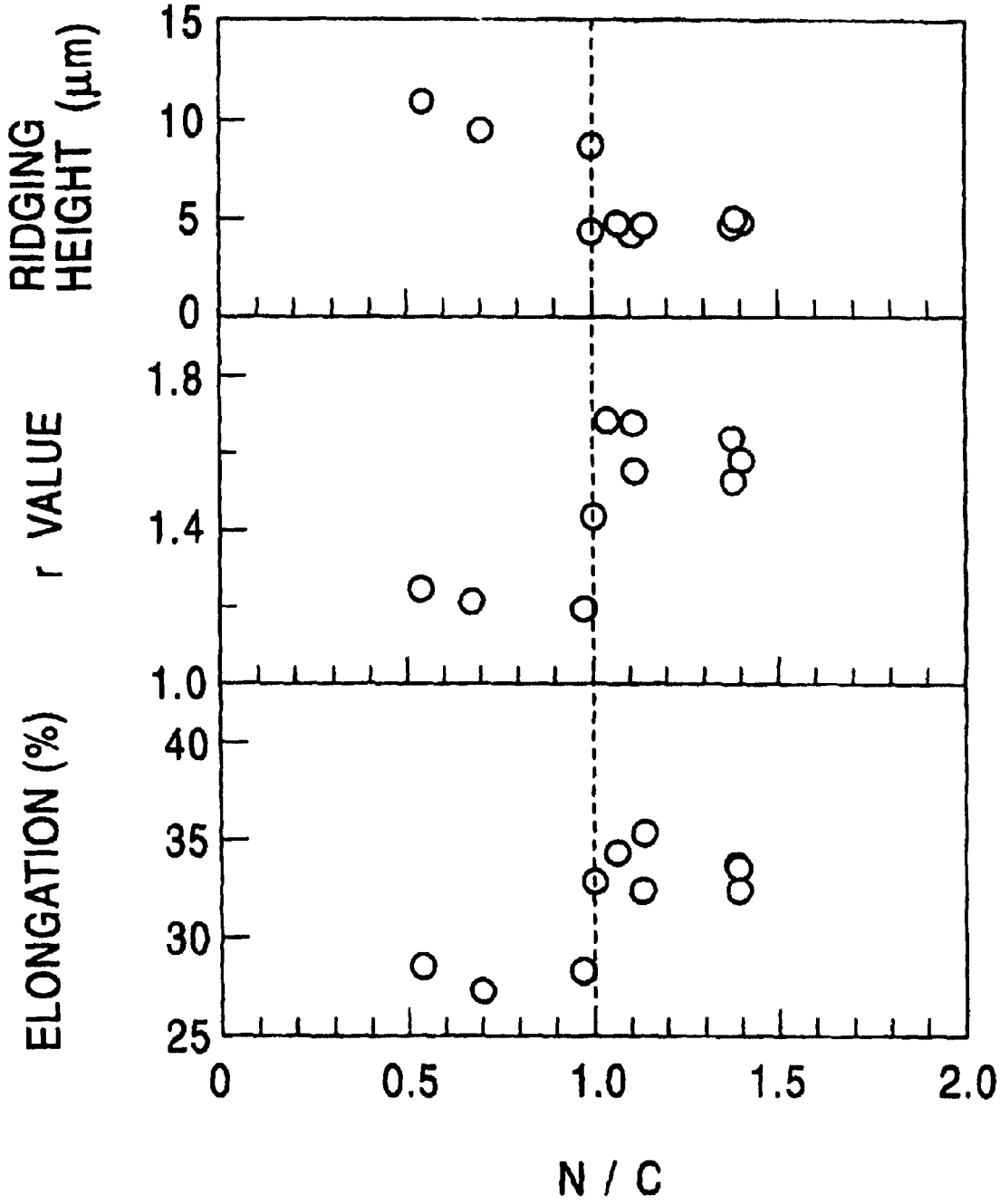
FIG. 2 is a graph showing the relation between the mechanical properties (elongation, r value, and ridging height) and (N/C) of a cold-rolled annealed sheet.

FIG. 2 shows the relation between N/C and the mechanical properties (elongate, r value, and ridging height) of a cold-rolled annealed sheet. With N/C of less than 1, all the elongation, the r value, and anti-ridging property deteriorate. Therefore, N/C is limited to 1 or more.

Like C, N dissolves in steel at the hot-rolling temperature to produce an austenite phase, fragmenting colonies having similar deformability, which cause the occurrence of ridging, and making fine the colonies. As a result, the occurrence of ridging is suppressed to improve the anti-ridging property.

Therefore, the N content is controlled to satisfy the relation to the C content represented by the equation (1) and (2), optimizing the composition balance between C and N. From the viewpoint of workability in hot-rolling, the N content is preferably 0.08 mass % or less.

V is contained to satisfy the relation to the N content represented by the following equation (3):

$$1.5\times10^{-3} \leqq (V\times N) \leqq 1.5\times10^{-2} \quad (3)$$

wherein N and V respectively represent the N content and the V content by mass %.

V is an important element for the present invention, and combines with N to form nitrides and carbonitrides such as VN and V(C, N), suppressing coarsening of crystal grains and decreasing the amounts of solute C and N. Therefore, the ductility, the r value and the anti-ridging property are improved. In order to get the maximum out of the effects, the composition balance between N and V must be optimized.

Figure 3:
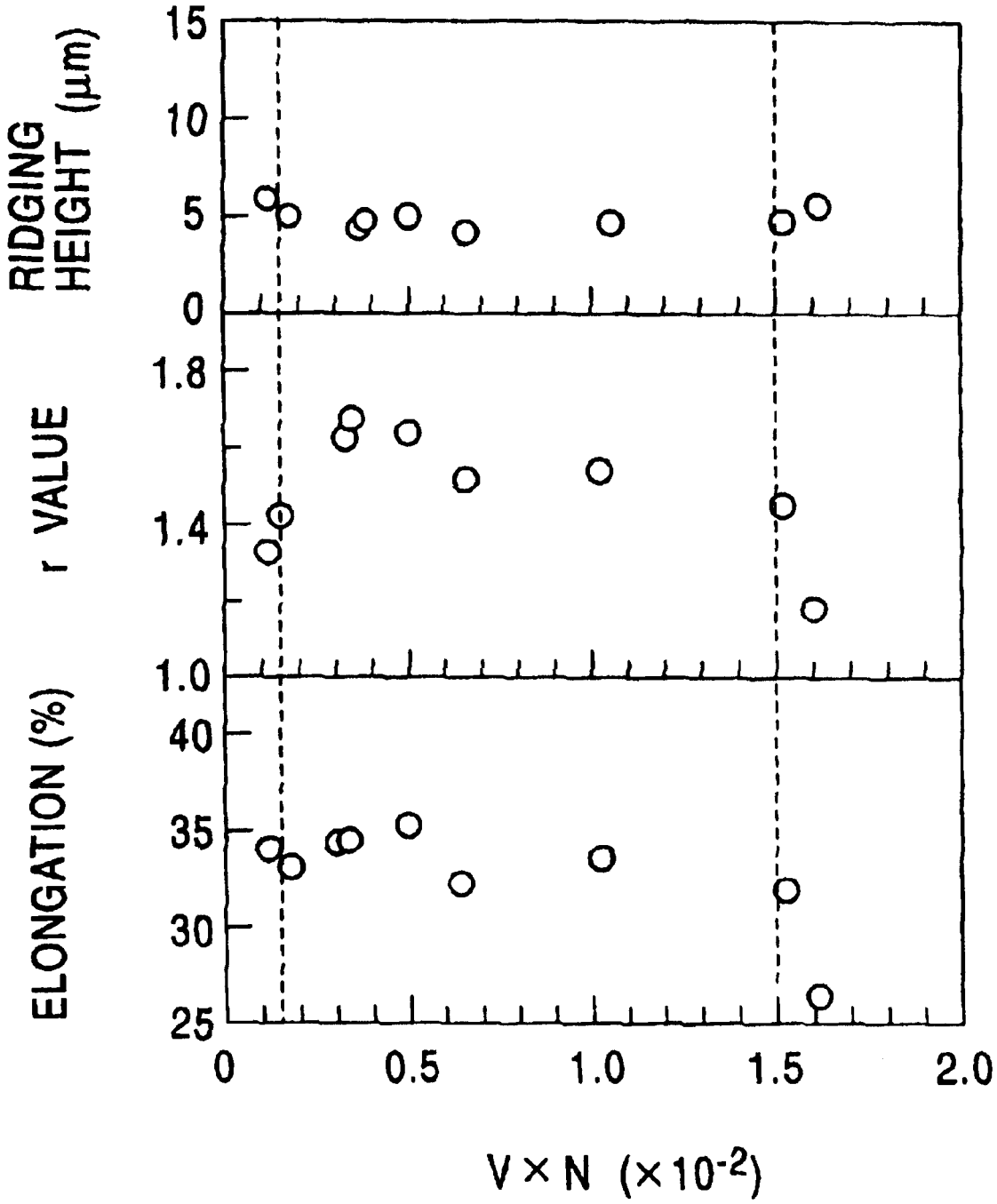
FIG. 3 is a graph showing the relation between the mechanical properties (elongation, r value, and ridging height) and (V×N) of a cold-rolled annealed sheet.

FIG. 3 shows the relation between (V×N) and the mechanical properties (elongation, r value, and ridging height) of a cold-rolled annealed sheet. With (V×N) of less than $1.5\times10^{-3}$, the r value is low, while with (V×N) of over $1.5\times10^{-2}$, both the r value and elongation deteriorate. Therefore, the V content is limited to satisfy the condition in which (V×N) is in the range of $1.5\times10^{-3}$ to $1.5\times10^{-2}$. From the economical viewpoint, the V content is preferably 0.30 mass % or less.

Figure 5:
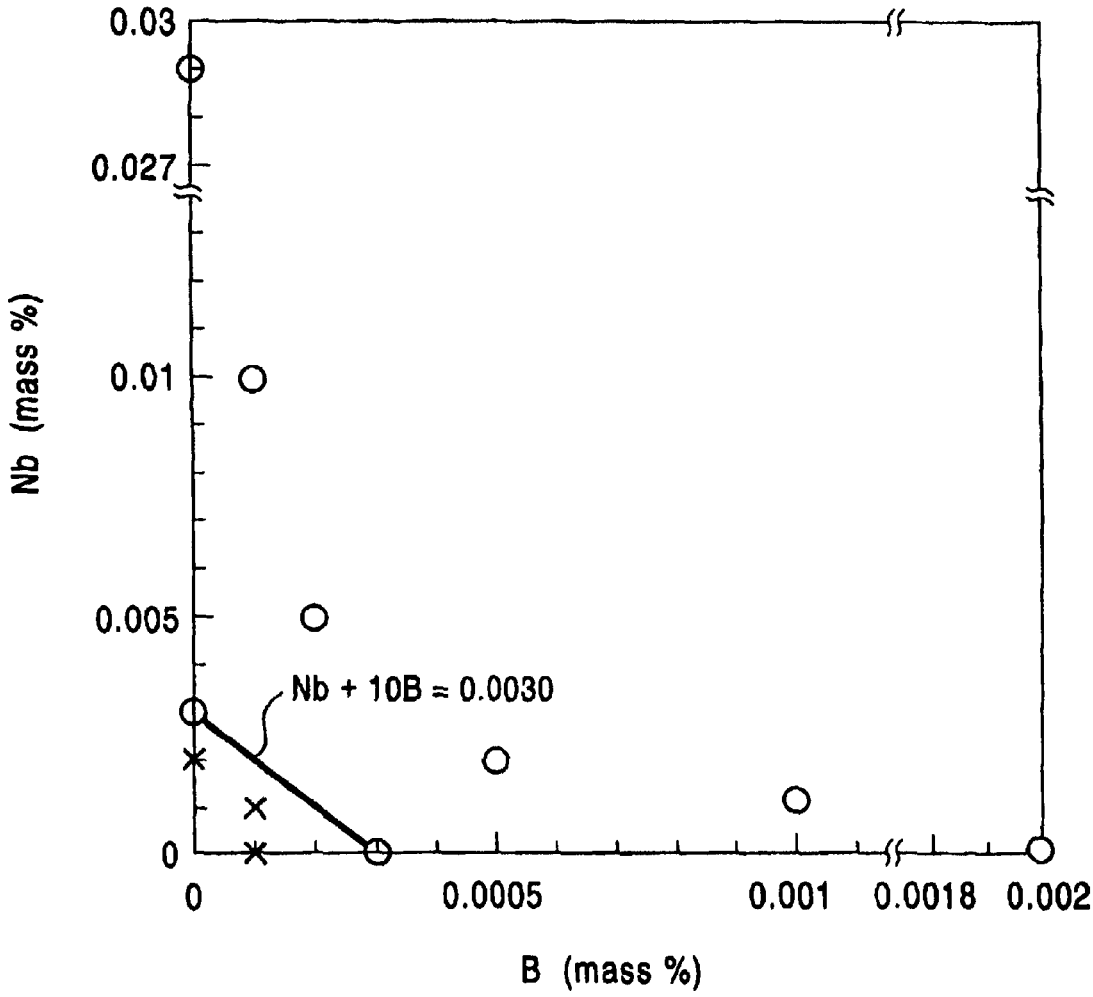
FIG. 5 is a graph showing the relation between the sensitization behavior and the Nb and B contents of a cold-rolled annealed sheet.

In the fourth invention, by adding one or two of Nb and B to satisfy the relation, $0.0030 \leqq (Nb+10B)$, the anti-sensitization property can be improved. In an actual operation, the finish annealing temperature is not necessarily constant and changes in the heating time and ultimate temperature cannot be avoided. In a ferritic stainless steel sheet, high-temperature annealing causes sensitization in the course of cooling, and grain boundaries are corroded in subsequent pickling to deteriorate the surface quality in some cases. Therefore, in order to obtain stable quality in an actual operation, it is important to prevent the occurrence of sensitization over a wide temperature range. FIG. 5 shows the results of examination of the influences of Nb and B on the sensitization property by using steel comprising (0.031–0.045)% C-(0.22–0.40)% Si-(0.27–0.73)% Mn-(0.024–0.045)% P-(0.005–0.007)% S-(0.001–0.003)% Al-(0.001–0.002)% Ti-(16.0–17.5)% Cr-(0.15–0.44)% Ni-(0.040–0.062)% N-(0.035–0.120)% V. A slab having the above composition was heated to 1170° C., and then hot-rolled at a finish delivery temperature of 830° C. to form a hot-rolled sheet. The thus-formed hot-rolled sheet was subjected to hot-rolled sheet annealing at 860° C. for 8 hours, pickled, and then cold-rolled with a total rolling reduction of 85% to form a cold-rolled sheet. The thus-formed cold-rolled sheet was finish-annealed at 900° C. for 30 seconds, and pickled to form a cold-rolled annealed sheet having a thickness of 0.8 mm. The surface of the thus-obtained cold-rolled annealed sheet was observed with a scanning electron microscope to examine the presence of grain boundary corrosion, to evaluate the surface quality. In evaluation, mark O represents no occurrence of corrosion, and mark x represents the occurrence of corrosion. FIG. 5 indicates that by adding Nb and B so that the adding amounts satisfy $(Nb+10B) \geqq 0.0030$, annealing at 900° C. can prevent grain boundary sensitization. This is possibly due to the fact that C and N present in steel are fixed by Nb and B to inhibit the precipitation of Cr carbonitride in the grain boundaries in cooling after annealing. However, an excessive addition of Nb and B deteriorates the surface quality, and thus the upper limits of the amounts of Nb and B added must be 0.030% and 0.0030%, respectively.

Next, the method of producing the steel sheet of the present invention is described.

Molten steel having the above composition is smelted by a conventional known converter or electric furnace, further refined by vacuum degassing (RH), VOD, AOD, or the like, and then cast by, preferably, a continuous casting method to obtain a rolling material (slab).

Then, the rolling material is heated, and hot-rolled to form a hot-rolled sheet. The heating temperature of hot rolling is preferably in the temperature range of 1050° C. to 1250° C., and the hot rolling finish delivery temperature is preferably 800 to 900° C. from the viewpoint of productivity.

In order to improve workability in the subsequent step, the hot-rolled sheet can be subjected to hot-rolled sheet annealing at 700° C. or more according to demand. The hot-rolled sheet can also be used as a product or a cold rolling material after descaling.

The hot-rolled sheet as the cold rolling material is cold-rolled with a cold rolling reduction of 30% or more, preferably 50 to 95%, to form a cold-rolled sheet. In order to further impart workability to the cold-rolled sheet, recrystallization annealing at 600° C. or more, preferably 700 to 900° C., can be performed. Cold rolling and annealing may be repeated two or more times. The cold-rolled sheet can be finished by 2D, 2B, and BA defined in Japanese Industrial Standard (JIS) G4305, and various types of polishing.

EXAMPLE 1

Molten steel having each of the compositions shown in Table 1 was smelted by a converter and secondary refined (VOD), and then cast by the continuous casting method to form a slab. The thus-formed slab was heated to 1170° C., and then hot-rolled at a finish delivery temperature of 830° C. to form a hot-rolled sheet. The thus-formed hot-rolled sheet was subjected to hot-rolled sheet annealing at 860° C. for 8 hours, pickled, and then cold-rolled with a total rolling reduction of 85% to form a cold-rolled sheet.

The thus-formed cold-rolled sheet was finish-annealed at 820° C. for 30 seconds to form a cold-rolled annealed sheet having a thickness of 0.8 mm. The elongation El, the r value and the ridging height of the thus-obtained cold-rolled annealed sheet were determined to evaluate formability represented by the elongation and r value, and the anti-ridging property. The elongation El, the r value and the ridging height were measured by the following methods.

(1) Elongation

JIS No. 13 specimens were collected from the cold-rolled annealed sheets in each of the directions (the rolling direction (L direction), the direction (T direction) perpendicular to the rolling direction, and the direction (D direction) at 45° with the rolling direction). A tensile test was carried out by using each of the tensile specimens to measure elongation in each of the directions. The mean value was determined by the following equation using the elongation values in each of the direction.

$$El=(El_L+2El_D+El_T)/4$$

wherein $El_L$, $El_D$, and $El_T$ represent elongations in the L direction, the D direction, and the T direction, respectively.

(2) r Value

JIS No. 13 specimens were collected from the cold-rolled annealed sheets in each of the directions (the rolling direction (L direction), the direction (T direction) perpendicular to the rolling direction, and the direction (D direction) at 45° with the rolling direction). The r value (Lankford value) in each direction was measured by the ratio of width strain to thickness strain with a 15% uniaxial tension prestrain applied to each specimen, and the mean value was determined by the following equation.

$$r=(r_L+2r_D+r_T)/4$$

wherein $r_L$, $r_D$, and $r_T$ represent the r values in the L direction, the D direction, and the T direction, respectively.

(3) Ridging Height

JIS No. 5 specimens were collected from the cold-rolled annealed sheets in the rolling direction. One side of each of the specimens was finish-polished with #600, and 20% uniaxial tension prestrain was applied to each specimen. Then, the ridging height of the surface at the center of each specimen was measured by a roughness gauge. The ridging height means unevenness due to the occurrence of ridging. The anti-ridging property was evaluated from the ridging height on the basis of the four ranks including A: 5 μm or less, B: over 5 μm to 10 μm, C: over 10 μm to 20 μm, and D: over 20 μm. The beauty increases as the ridging height decreases. The obtained results are shown in Table 2.

In all examples of the present invention, El is 30% or more, the r value is 1.4 or more, the ridging height is rank A in which the ridging height is 5 μm or less, and good formability and anti-ridging property are exhibited.

On the other hand, in comparative examples out of the range of the present invention, the anti-ridging property is rank B or worse, and thus the anti-ridging property deteriorates. Furthermore, elongation or the r value deteriorates to fail to satisfy both the good formability and the surface quality after forming.

EXAMPLE 2

Molten steel having each of the compositions shown in Table 3 was smelted by a converter and secondary refined (VOD), and then cast by the continuous casting method to form a slab. The thus-formed slab was heated to 1170° C., and then hot-rolled at a finish delivery temperature of 830° C. to form a hot-rolled sheet. The thus-formed hot-rolled sheet was subjected to hot-rolled sheet annealing at 860° C. for 8 hours, pickled, and then cold-rolled with a total rolling reduction of 85% to form a cold-rolled sheet.

The thus-formed cold-rolled sheet was finish-annealed at 820° C. for 30 seconds to form a cold-rolled annealed sheet having a thickness of 0.8 mm. The elongation El, the r value and the ridging height of the thus-obtained cold-rolled annealed sheet were determined to evaluate formability represented by the elongation and r value, and the anti-ridging property.

The obtained results are shown in Table 4.

In all examples of the present invention, El is 30% or more, the r value is 1.4 or more, the ridging height is rank A in which the ridging height is 5 μm or less, and good formability and anti-ridging property are exhibited.

INDUSTRIAL APPLICABILITY

According to the present invention, by appropriately controlling the component composition, particularly the C, N and V contents, it is possible to produce at low cost a ferritic stainless steel sheet having good formability, excellent anti-ridging property, and excellent surface quality after forming, exhibiting a significant industrial effect.

Furthermore, by adding appropriate amounts of Nb and B, it is possible to stably produce a steel sheet having improved anti-sensitization property and surface quality.

TABLE 1

| Steel No. | Chemical Composition (mass %) C | Si | Mn | P | S | Al | Ti | Cr | Ni | N | V | C + N | N/C | V × N | Remarks |
|---|---|---|---|---|---|---|---|---|---|---|---|---|---|---|---|
| 1 | 0.040 | 0.32 | 0.59 | 0.044 | 0.006 | 0.003 | 0.001 | 16.1 | 0.31 | 0.055 | 0.062 | 0.095 | 1.38 | 0.0034 | Example of this invention |
| 2 | 0.040 | 0.32 | 0.59 | 0.044 | 0.006 | 0.003 | 0.001 | 16.1 | 0.31 | 0.040 | 0.038 | 0.080 | 1.00 | 0.0015 | Example of this invention |
| 3 | 0.057 | 0.31 | 0.61 | 0.048 | 0.006 | 0.002 | 0.005 | 17.2 | 0.52 | 0.063 | 0.102 | 0.120 | 1.11 | 0.0064 | Example of this invention |
| 4 | 0.028 | 0.30 | 0.52 | 0.032 | 0.005 | 0.004 | 0.002 | 18.0 | 0.40 | 0.032 | 0.152 | 0.060 | 1.14 | 0.0049 | Example of this invention |
| 5 | 0.041 | 0.31 | 0.62 | 0.030 | 0.006 | 0.005 | 0.002 | 16.1 | 0.23 | 0.057 | 0.181 | 0.098 | 1.39 | 0.0103 | Example of this invention |
| 6 | 0.042 | 0.33 | 0.57 | 0.037 | 0.007 | 0.002 | 0.003 | 16.2 | 0.23 | 0.057 | 0.258 | 0.100 | 1.38 | 0.0150 | Example of this invention |
| 7 | 0.047 | 0.32 | 0.60 | 0.025 | 0.006 | 0.002 | 0.003 | 16.3 | 0.37 | 0.050 | 0.070 | 0.098 | 1.06 | 0.0035 | Example of this invention |
| 8 | 0.020 | 0.29 | 0.59 | 0.044 | 0.006 | 0.003 | 0.002 | 16.1 | 0.34 | 0.032 | 0.061 | 0.052 | 1.60 | 0.0020 | Comparative Example |
| 9 | 0.059 | 0.32 | 0.51 | 0.039 | 0.006 | 0.004 | 0.004 | 16.1 | 0.51 | 0.073 | 0.060 | 0.132 | 1.24 | 0.0044 | Comparative Example |
| 10 | 0.049 | 0.30 | 0.62 | 0.030 | 0.006 | 0.003 | 0.004 | 16.8 | 0.43 | 0.048 | 0.153 | 0.097 | 0.98 | 0.0073 | Comparative Example |
| 11 | 0.051 | 0.32 | 0.59 | 0.035 | 0.006 | 0.003 | 0.003 | 16.1 | 0.30 | 0.034 | 0.119 | 0.085 | 0.67 | 0.0040 | Comparative Example |
| 12 | 0.060 | 0.32 | 0.59 | 0.041 | 0.006 | 0.005 | 0.003 | 16.2 | 0.27 | 0.031 | 0.077 | 0.091 | 0.52 | 0.0024 | Comparative Example |
| 13 | 0.040 | 0.32 | 0.65 | 0.046 | 0.007 | 0.004 | 0.001 | 17.0 | 0.29 | 0.055 | 0.020 | 0.095 | 1.38 | 0.0011 | Comparative Example |
| 14 | 0.038 | 0.32 | 0.60 | 0.033 | 0.007 | 0.002 | 0.002 | 17.0 | 0.31 | 0.051 | 0.313 | 0.089 | 1.34 | 0.0160 | Comparative Example |
| 15 | 0.044 | 0.31 | 0.62 | 0.038 | 0.006 | 0.008 | 0.002 | 16.1 | 0.32 | 0.049 | 0.062 | 0.093 | 1.11 | 0.0030 | Comparative Example |
| 16 | 0.049 | 0.30 | 0.66 | 0.047 | 0.007 | 0.003 | 0.010 | 17.3 | 0.55 | 0.051 | 0.062 | 0.100 | 1.04 | 0.0032 | Comparative Example |
| 17 | 0.014 | 0.30 | 0.60 | 0.035 | 0.006 | 0.003 | 0.001 | 16.6 | 0.29 | 0.048 | 0.120 | 0.062 | 3.43 | 0.0058 | Comparative Example |
| 18 | 0.078 | 0.32 | 0.62 | 0.041 | 0.007 | 0.004 | 0.005 | 16.2 | 0.33 | 0.080 | 0.070 | 0.158 | 1.03 | 0.0056 | Comparative Example |

TABLE 2

| Steel No. | Formability Elongation (%) | r value | Anti-ridging property Ridging height μm | Evaluation | Remarks |
|---|---|---|---|---|---|
| 1 | 34.3 | 1.62 | 4.3 | A | Example of this invention |
| 2 | 33.1 | 1.43 | 4.5 | A | Example of this invention |
| 3 | 32.4 | 1.53 | 4.2 | A | Example of this invention |
| 4 | 35.2 | 1.65 | 4.8 | A | Example of this invention |
| 5 | 33.7 | 1.55 | 4.4 | A | Example of this invention |
| 6 | 32.0 | 1.48 | 4.7 | A | Example of this invention |
| 7 | 34.4 | 1.68 | 4.7 | A | Example of |

TABLE 2-continued

| Steel No. | Formability Elongation (%) | r value | Anti-ridging property Ridging height μm | Evaluation | Remarks |
|---|---|---|---|---|---|
| | | | | | this invention |
| 8 | 34.4 | 1.56 | 15.0 | C | Comparative Example |
| 9 | 25.6 | 1.10 | 5.4 | B | Comparative Example |
| 10 | 28.3 | 1.18 | 8.8 | B | Comparative Example |
| 11 | 27.1 | 1.20 | 9.3 | B | Comparative Example |
| 12 | 28.5 | 1.23 | 11.2 | C | Comparative Example |
| 13 | 33.3 | 1.35 | 5.3 | B | Comparative Example |
| 14 | 26.0 | 1.17 | 5.5 | B | Comparative Example |
| 15 | 27.3 | 1.31 | 10.2 | C | Comparative Example |
| 16 | 26.5 | 1.29 | 10.5 | C | Comparative Example |
| 17 | 33.7 | 1.42 | 12.2 | C | Comparative Example |
| 18 | 23.7 | 0.93 | 5.2 | B | Comparative Example |

TABLE 3

| | Chemical Composition (mass %) C | Si | Mn | P | S | Al | Ti | Cr | Ni | N | V | Remarks |
|---|---|---|---|---|---|---|---|---|---|---|---|---|
| 19 | 0.044 | 0.30 | 0.30 | 0.042 | 0.005 | 0.001 | 0.001 | 16.2 | 0.26 | 0.054 | 0.055 | Example of this invention |
| 20 | 0.041 | 0.22 | 0.73 | 0.045 | 0.007 | 0.001 | 0.001 | 16.4 | 0.22 | 0.046 | 0.035 | Example of this invention |
| 21 | 0.040 | 0.40 | 0.55 | 0.040 | 0.006 | 0.002 | 0.001 | 16.2 | 0.44 | 0.062 | 0.120 | Example of this invention |
| 22 | 0.034 | 0.30 | 0.50 | 0.033 | 0.006 | 0.002 | 0.002 | 16.0 | 0.41 | 0.040 | 0.047 | Example of this invention |
| 23 | 0.041 | 0.31 | 0.44 | 0.031 | 0.006 | 0.001 | 0.001 | 16.3 | 0.33 | 0.057 | 0.064 | Example of this invention |
| 24 | 0.044 | 0.33 | 0.61 | 0.038 | 0.006 | 0.003 | 0.001 | 17.5 | 0.30 | 0.058 | 0.083 | Example of this invention |
| 25 | 0.045 | 0.32 | 0.27 | 0.024 | 0.006 | 0.002 | 0.001 | 16.2 | 0.15 | 0.049 | 0.110 | Example of this invention |
| 26 | 0.031 | 0.29 | 0.40 | 0.041 | 0.006 | 0.001 | 0.002 | 16.1 | 0.31 | 0.044 | 0.061 | Example of this invention |

| | Chemical Composition (mass %) C + N | N/C | V × N | Nb | B | Nb + 10B | Remarks |
|---|---|---|---|---|---|---|---|
| 19 | 0.098 | 1.23 | 0.0030 | 0.003 | <0.0001 | 0.0030 | Example of this invention |
| 20 | 0.087 | 1.12 | 0.0016 | 0.010 | 0.0001 | 0.0110 | Example of this invention |

TABLE 3-continued

| | | | | | | | |
|---|---|---|---|---|---|---|---|
| 21 | 0.102 | 1.55 | 0.0074 | 0.029 | <0.0001 | 0.0290 | Example of this invention |
| 22 | 0.074 | 1.18 | 0.0019 | 0.005 | 0.0002 | 0.0070 | Example of this invention |
| 23 | 0.098 | 1.39 | 0.0036 | <0.001 | 0.0003 | 0.0030 | Example of this invention |
| 24 | 0.102 | 1.32 | 0.0048 | 0.002 | 0.0005 | 0.0070 | Example of this invention |
| 25 | 0.094 | 1.09 | 0.0054 | 0.001 | 0.0010 | 0.0110 | Example of this invention |
| 26 | 0.075 | 1.42 | 0.0027 | <0.001 | 0.0020 | 0.0200 | Example of this invention |

TABLE 4

| | Formability | | Anti-ridging property | | |
|---|---|---|---|---|---|
| Steel No. | Elongation (%) | r value | Ridging height μm | Evaluation | Remarks |
| 19 | 34.4 | 1.59 | 4.4 | A | Example of this invention |
| 20 | 35.0 | 1.62 | 4.8 | A | Example of this invention |
| 21 | 32.2 | 1.43 | 4.1 | A | Example of this invention |
| 22 | 34.0 | 1.58 | 4.5 | A | Example of this invention |
| 23 | 34.1 | 1.53 | 4.6 | A | Example of this invention |
| 24 | 32.7 | 1.50 | 4.6 | A | Example of this invention |
| 25 | 34.5 | 1.62 | 4.4 | A | Example of this invention |
| 26 | 32.0 | 1.47 | 4.2 | A | Example of this invention |

What is claimed is:

[1. A ferritic stainless steel sheet having excellent formability, comprising, by mass %:

C: 0.02 to 0.06%;

Si: 1.0% or less;

Mn: 1.0% or less;

P: 0.05% or less;

S: 0.01% or less;

Al: 0.005% or less;

Ti: 0.005% or less;

Cr: 11 to 30%;

Ni: 0.7% or less; and the balance composed of Fe, and N and V as inevitable impurities, wherein N is contained to satisfy the relation to the C content represented by the following equations (1) and (2), and V is contained to satisfy the relation to the N content represented by the following equation (3):

$$0.06 \leqq (C+N) \leqq 0.12 \quad (1)$$

$$1 \leqq N/C \quad (2)$$

$$1.5\times10^{-3} \leqq (V\times N) \leqq 1.5\times10^{-2} \quad (3)$$

Wherein C, N and V equal the contents (mass %) of the elements;

wherein said sheet is made by continuous casting, reheating at 1050 to 1250° C., hot rolling with finish delivery temperature at 800 to 900° C. and cold rolling with 50–95% reduction.]

[2. A ferritic stainless steel sheet having excellent formability according to claim 1, wherein Si is present, by mass %, from 0.03 to 0.5%.]

[3. A ferritic stainless steel sheet having excellent formability according to claim 1 or 2, wherein Mn is present, by mass %, from 0.3 to 0.8%.]

[4. A ferritic stainless steel sheet having excellent formability, comprising, by mass %, of:

C: 0.02 to 0.06%;

Si: 1.0% or less;

Mn: 1.0% or less;

P: 0.05% or less;

S: 0.01% or less;

Al: 0.005% or less;

Ti: 0.005% or less;

Cr: 11 to 30%;

Ni: 0.7% or less; and the balance composed of Fe, and N and V as inevitable impurities, wherein N is contained to satisfy the relation to the C content represented by the following equations (1) and (2), and V is contained to satisfy the relation to the N content represented by the following equation (3):

$$0.06 \leqq (C+N) \leqq 0.12 \quad (1)$$

$$1 \leqq N/C \quad (2)$$

$$1.5\times10^{-3} \leqq (V\times N) \leqq 1.5\times10^{-2} \quad (3)$$

wherein C, N and V: equal the contents (mass %) of the elements, further consisting, by mass %, of one or two of Nb and B to satisfy the following equation (4):

$$0.0030 \leqq (Nb+10B) \quad (4)$$

wherein Nb and B equal the contents (mass %) of the elements;

wherein said sheet is made by continuous casting, reheating at 1050 to 1250° C., hot rolling with finish delivery temperature at 800 to 900° C. and cold rolling with 50–95% reduction.]

5. A ferritic *cold rolled* stainless steel sheet according to claim [4] *8* wherein Si is present between 0.03 and 0.5% by mass.

6. A ferritic *cold rolled* stainless steel according to claim [4] *8* or 5 wherein Mn is present between 0.3 to 0.8% by mass.

*7. A ferritic cold rolled stainless steel sheet according to claim 8, wherein N is present in an amount of ≦0.08% by mass.*

*8. A ferritic cold rolled stainless steel sheet having excellent formability, consisting of, by mass %, of:*

*C: 0.02 to 0.06%;*

*Si: 1.0% or less;*

*Mn: 1.0% or less;*

*P: 0.05% or less;*

*S: 0.01% or less;*

*Al: 0.005% or less;*

*Ti: 0.005% or less;*

*Cr: 16.1 to 18.0%;*

*Nb: 0.029% or less;*

*B: 0.003% or less;*

*Ni: 0.7% or less; and*

*the balance composed of Fe, and inevitable impurities, in a single-phase ferrite microstructure, wherein N is contained to satisfy the relation to the C content represented by the following equations (1) and (2), and V is contained to satisfy the relation to the N content represented by the following equation (3):*

$$0.06 \leqq (C+N) \leqq 0.12 \quad (1)$$

$$1 \leqq N/C \quad (2)$$

$$1.5\times10^{-3} \leqq (V\times N) \leqq 1.5\times10^{-2} \quad (3)$$

*wherein C, N and V: equal the contents (mass %) of the elements, further consisting, by mass %, of one or two of Nb and B to satisfy the following equation (4):*

$$0.0030 \leqq (Nb+10B) \quad (4)$$

*wherein Nb and B equal the contents (mass %) of the elements;*

*wherein said sheet is made by continuous casting, reheating at 1050 to 1250° C., hot rolling, and followed by cold rolling with 50–95% reduction.*

* * * * *

UNITED STATES PATENT AND TRADEMARK OFFICE

CERTIFICATE OF CORRECTION

PATENT NO. : RE 40,950 E
APPLICATION NO. : 10/678057
DATED : November 10, 2009
INVENTOR(S) : Ota et al.

It is certified that error appears in the above-identified patent and that said Letters Patent is hereby corrected as shown below:

In Column 10

At Table 1, at No. 7, at the subheading, C + N, please change "0.098" to --0.097--.

Signed and Sealed this

Thirtieth Day of March, 2010

David J. Kappos

David J. Kappos
*Director of the United States Patent and Trademark Office*